United States Patent [19]

Bulmahn

[11] Patent Number: 4,679,634
[45] Date of Patent: Jul. 14, 1987

[54] APPARATUS FOR EXTENDING THE FRAME OF A TRACTOR

[76] Inventor: Gerald L. Bulmahn, Rural Rte. 8, P.O. Box 173, Decatur, Ind. 46733

[21] Appl. No.: 828,287

[22] Filed: Feb. 11, 1986

[51] Int. Cl.⁴ .................. A01B 59/044; A01B 63/104
[52] U.S. Cl. .................................... 172/250; 172/292; 172/297; 172/443; 172/446; 172/449; 180/900; 180/209
[58] Field of Search .................. 180/135, 209, 900; 172/443, 446, 449, 451, 450, 245, 247, 250, 251, 253, 297, 303, 292, 788, 789, 781, 791, 793

[56] References Cited

U.S. PATENT DOCUMENTS

| | | | |
|---|---|---|---|
| 1,636,628 | 7/1927 | Curtis | 180/900 |
| 1,658,354 | 2/1928 | Ronning | 180/900 |
| 1,706,256 | 3/1929 | Ronning | 172/292 X |
| 1,847,249 | 3/1932 | Knopy | 180/900 |
| 1,883,405 | 10/1932 | Ronning | 180/900 |
| 2,130,274 | 9/1938 | Harrison | 172/793 |
| 2,693,747 | 11/1954 | Tanke | 172/292 |
| 2,727,756 | 12/1955 | Van Carlile | 172/450 |
| 2,788,858 | 4/1957 | Aasland | 180/209 X |
| 2,836,112 | 5/1958 | Griffin | 172/292 |
| 3,310,123 | 3/1967 | Abbott | 172/450 |
| 3,527,315 | 9/1970 | Hampton | 172/781 X |
| 3,563,329 | 2/1971 | Licari | 180/12 |
| 3,822,756 | 7/1974 | Martin | 180/14 R |
| 3,899,976 | 6/1975 | Jesswein | 280/400 |
| 4,040,497 | 8/1977 | Thomas | 172/297 |
| 4,076,080 | 2/1978 | Anderson | 172/804 |
| 4,161,987 | 7/1979 | Tolmer | 172/791 |
| 4,175,625 | 11/1979 | Puckett | 172/791 |

FOREIGN PATENT DOCUMENTS

| | | | |
|---|---|---|---|
| 243037 | 1/1963 | Australia | 172/450 |
| 638504 | 3/1962 | Canada . | |
| 1296565 | 1/1961 | France . | |
| 6506270 | 11/1965 | Netherlands | 172/292 |

OTHER PUBLICATIONS

Farm Show, vol. 8, No. 5, 1984, "Util-A-Trac" article, p. 9, received in USPTO 11/Sep. 1984.
Farm Show, vol. 9, No. 5, p. 8, Special-Built Ridge Tractor (Hiniker) 9-9-85.
Advertisement for Buckeye Tractor Company.
No-Till Farmer, Oct. 1985, p. 4.
Farm Industry News, Oct. 1984, vol. 17, No. 8, p. 55, "Ridge Planting" publication.
Hiniker publication entitled, "Econ-O-Till 3500/3800".

Primary Examiner—Richard J. Johnson
Attorney, Agent, or Firm—Jeffers, Hoffman & Niewyk

[57] ABSTRACT

An apparatus for extending the frame of a conventional tractor whereby an agricultural implement may be mounted between the front and rear wheels of the tractor. A tractor is converted to an extended frame tractor by dismounting the front wheels of the tractor, attaching the extension frame to the frame of the tractor and then mounting the front wheels on the front of the extension frame. Extension power lines for powering the steering mechanism and the hitch control mechanism are coupled between the tractor power lines and the remounted front wheel assembly. The extension frame is also articulated at its connection point to the frame of the tractor for improved control of the tractor assembly. A mechanism is provided for shifting the farm implement laterally with respect to the front wheels of the tractor for proper alignment of the implement with the crop rows. Spring shock absorbers are also provided for cushioning forces to the agricultural implement caused by uneven terrain.

12 Claims, 10 Drawing Figures

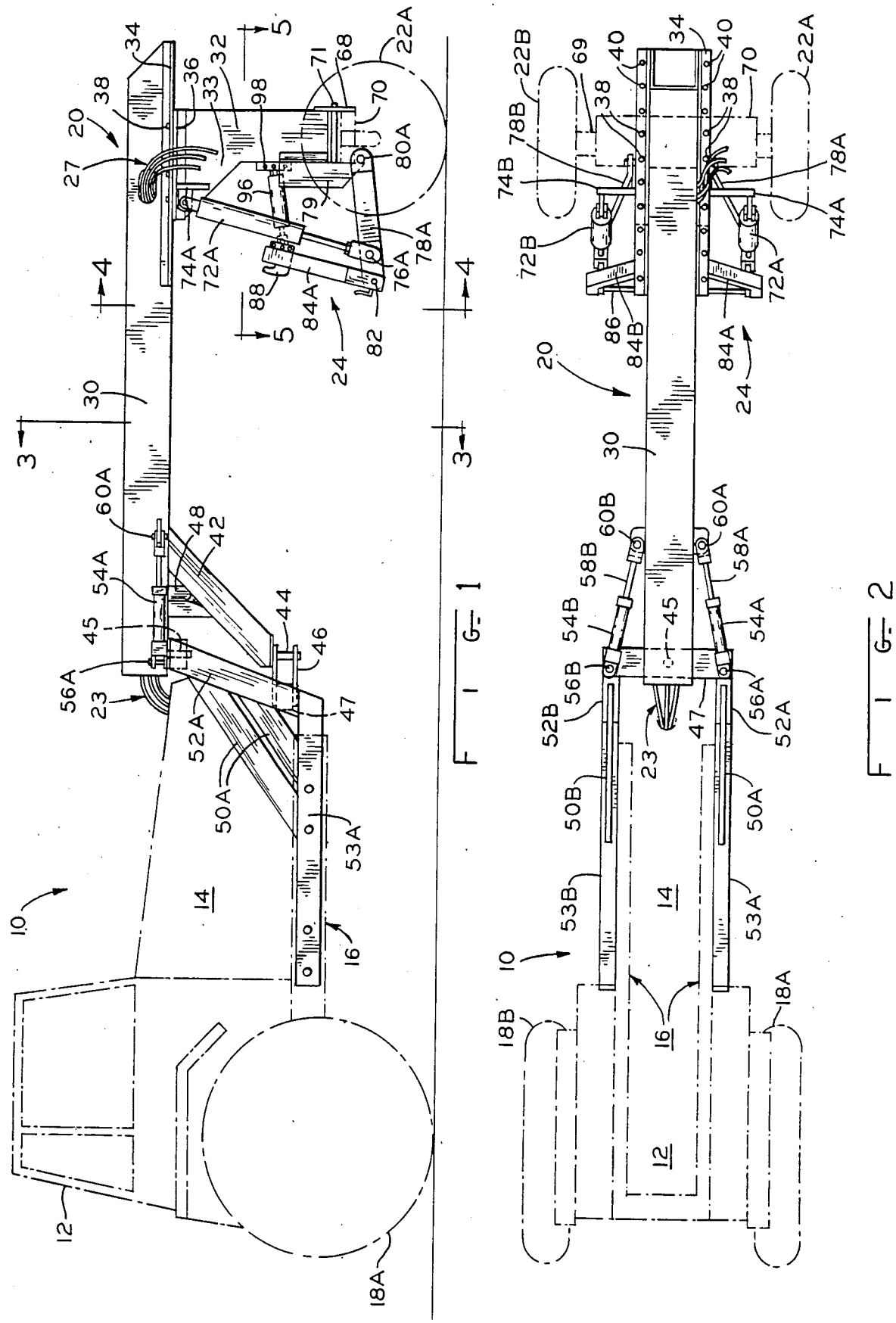

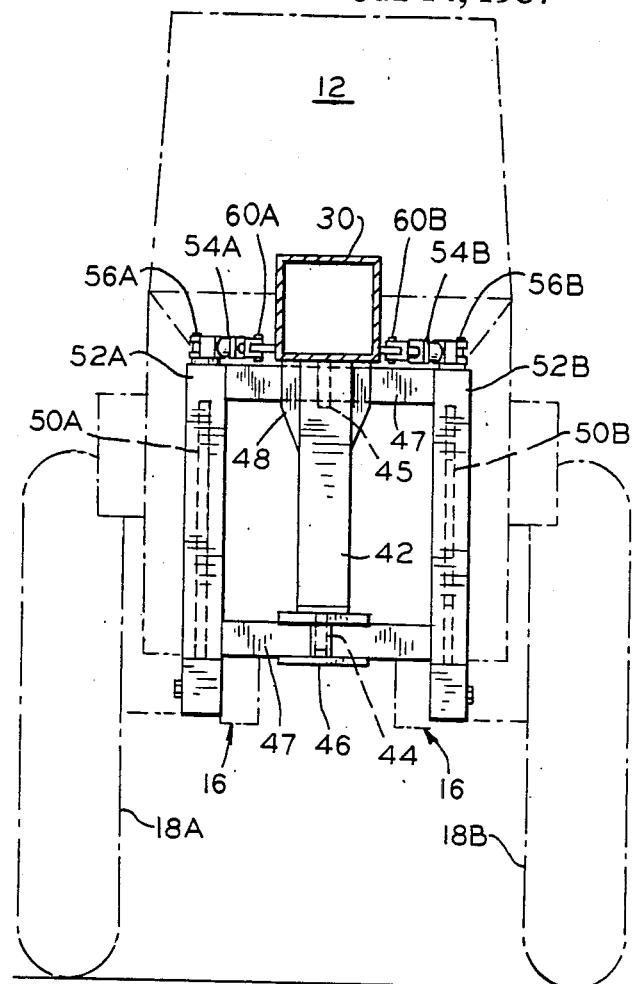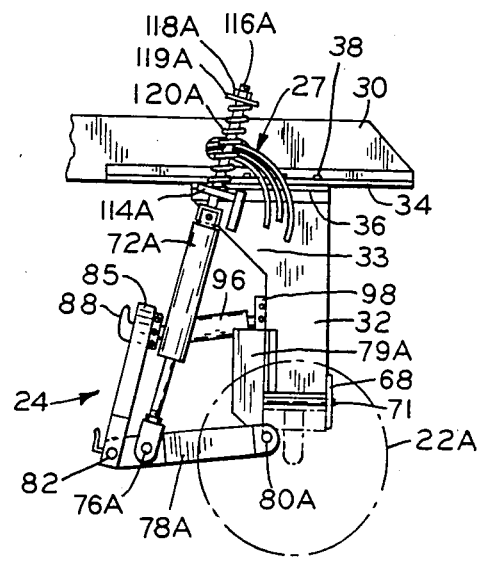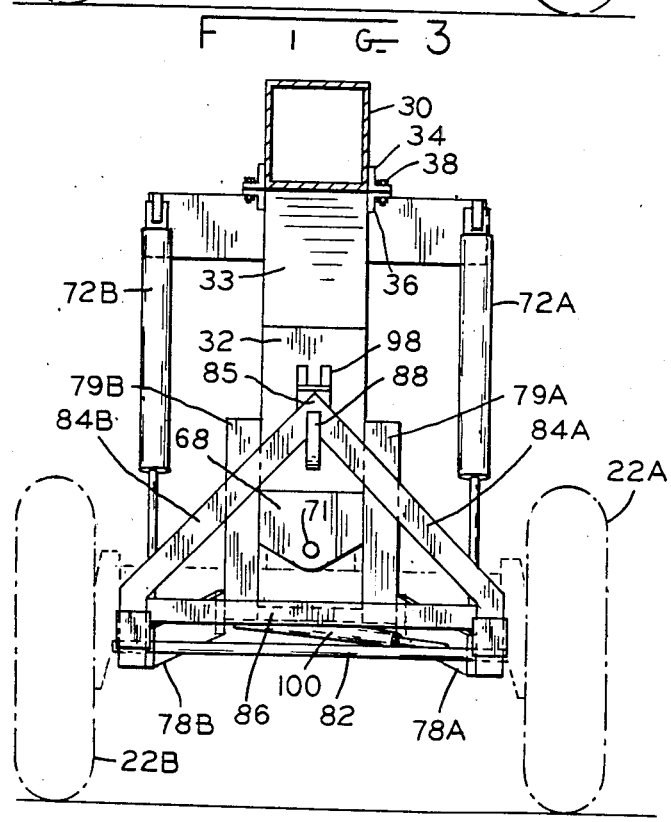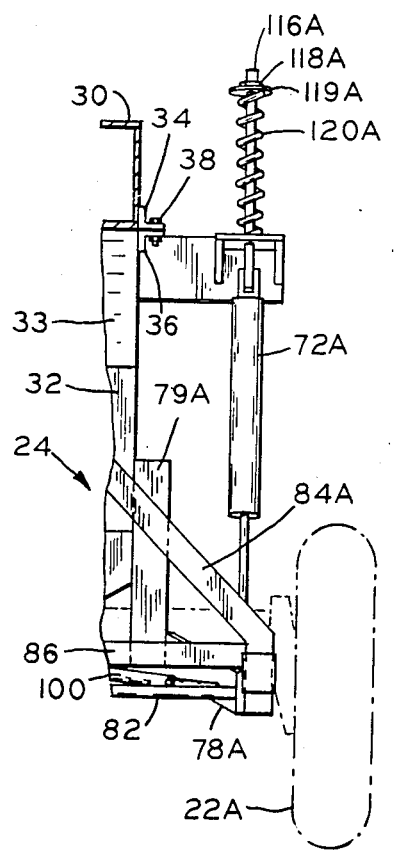

APPARATUS FOR EXTENDING THE FRAME OF A TRACTOR

BACKGROUND OF THE INVENTION

This invention relates to agricultural tractors and in particular to a method and apparatus for extending or stretching the frame of a tractor whereby an agricultural implement may be attached between the front and rear wheels of the tractor.

The present invention is especially useful in ridge till farming of row crops wherein the crops are planted on ridges. The ridge till farming method has become increasingly popular because it enables farmers to grow crops without conventional plowing to prepare the soil for planting thereby saving substantial amounts of both fuel and labor. Furthermore, the ridge till method is advantageous because it reduces soil erosion and soil loss, and reduces the run-off of fertilizers, pesticides, and moisture from the fields.

While tractors have been provided in the past which permitted side mounting of cultivators, planters, and similar agricultural implements, the most common method of attaching agricultural implements to tractors has been to attach the implements behind the tractor. This method of attachment has been satisfactory with conventional farming techniques. However, this method of attaching agricultural implements presents a number of problems when the ridge till method of farming is employed. In the ridge till method, the ridges are normally approximately thirty (30) inches apart and six to eight (6–8) inches high. It is very important for the tractor operator to properly align the agricultural implement, such as a planter or cultivator, with the ridges. If a conventional tractor with a rear mounted agricultural implement is used, the operator must periodically look backwards to assure that the implement is properly aligned with the ridges. Furthermore, the operator must continually look at the tractor front wheels to assure that they are properly aligned with the valleys between the ridges. Thus, the operator must continually swivel his head back and forth. This is rather difficult to do and results in increased fatigue for the tractor operator. More importantly, by mounting the implement behind the tractor, control over the alignment of the implement and adjustments in alignment are difficult to achieve due to the lack of visibility. Normally the operator is at least six (6) feet off the ground and is surrounded by the cab frame. It is therefore difficult for him to look backward and continually assure that proper alignment of the agricultural implement with the ridges is being achieved, thus resulting in poor control over implement alignment. Control is especially important in ridge till planting as misalignment affects the seed planting depth and therefore adversely affects crop yields. Furthermore, control in ridge till cultivating is very important as misalignment of the cultivator may result in root pruning, or even total destruction of the plants. While mounting an agricultural implement ahead of the tractor operator is particularly useful in the ridge till method of farming, such a mounting arrangement would also be advantageous for use in conventional farming methods. It is therefore desired to provide a method for mounting an agricultural implement ahead of the tractor operator to improve visibility by the operator and control over the implement.

Prior art tractors have also been provided which permitted mounting of farm implements in front of the front wheels. However, this implement mounting arrangement results in loss of control as there is an increase in the lateral distance which the implement moves for a given amount of turning adjustment of the tractor front wheels. Thus the operator will tend to overadjust the implement so that alignment of the implement with the ridges is difficult to maintain. Furthermore, due to the large size of agricultural implements, the amount of weight which would be cantilevered from the tractor front wheels in such a mounting arrangement is substantial, thereby resulting in further loss of control over the implement and its alignment with the ridges. It is therefore desired, for improved control of an agricultural implement and for better distribution of the weight of an agricultural implement, to provide a tractor to which an agricultural implement may be mounted between the front and rear wheels of the tractor. In such an arrangement, control over the implement is improved and the weight of the implement is distributed between the front wheels and the rear wheels of the tractor.

Ridge till tractors have also been proposed wherein the frame of the tractor is quite long and is quite high above the ground so that an agricultural implement may be mounted between the tractor front and rear wheels. Such ridge till tractors have been proposed to improve control and visibility of the agricultural implement. However, such proposed tractors are very specialized and would only be useful for mounting agricultural implements between the tractor front and rear wheels and would be unsuited for rear mounting of agricultural implements. Since various agricultural implements are suitable for rear mounting only and cannot be mounted between the tractor front and rear wheels, a farmer would therefore need to purchase a specialized ridge till tractor as well as a conventional tractor for pulling certain agricultural implements such as fertilizing implements, grain carts, plows, and the like. The expense involved for a farmer in purchasing and maintaining a ridge till tractor would thus be quite high. For instance, at today's prices, it is estimated that the cost of a specialized ridge till tractor would be in excess of fifty thousand dollars ($50,000). Furthermore, by necessitating the purchase of two (2) tractors, namely a conventional tractor and a specialized ridge till tractor, a farmer would also need to provide storage space for the extra tractor and would incur added maintenance costs.

It is therefore desired to provide a method and apparatus for converting a conventional tractor to a tractor wherein a farm implement may be mounted between the tractor front and rear wheels so that farmers do not need to purchase a specialized ridge till tractor. It is furthermore desired to provide a method and apparatus for extending or stretching the frame of a conventional tractor whereby a farmer may adapt his conventional tractor to a ridge till tractor and may convert the tractor back to a conventional tractor when desired.

Still another problem which has been encountered in ridge till farming with rear mounted agricultural implements is that, on hilly slopes when the tractor tends to slide, any adjustments which the tractor operator makes for this sliding movement will be counterproductive in aligning the agricultural implement with the ridges. It is therefore desired to provide a tractor wherein the agricultural implement is mounted between the front and rear wheels so that adjustments for the sliding movements of the tractor on hilly slopes will not adversely affect alignment of the agricultural implement. Accordingly, it is desired to provide an articulated extended frame for extending the frame of a cantilevered tractor to improve the "crabbing" ability of the extended tractor while maintaining the alignment of the agricultural implement with the ridges.

SUMMARY OF THE INVENTION

The present invention provides a method and apparatus for converting a conventional tractor to a tractor having an elongated or extended frame whereby an agricultural implement may be attached between the front and rear wheels of the tractor. In the method according to the present invention, the front wheels and axle of the conventional tractor are removed, and an extension frame is attached to the front of the tractor frame. The tractor front wheels and axle are then attached to the front of the extension frame. The extension frame may, of course, also be provided with its own set of front wheels. Lastly, extensions are connected from the tractor to the steering and control mechanism for the tractor front wheels.

The present invention, in one form thereof, provides an extension frame for a tractor. The extension frame includes at least one pivot pin whereby the extension frame may be pivotally attached to the tractor frame to form an articulated extended frame. The front wheels and axle of the tractor are detached from the tractor frame and are then attached to the front of the extension frame. Extensions are connected between the front wheel control and steering mechanism and the tractor steering apparatus. Furthermore, a pair of hydraulic cylinders are provided for controlling the articulation of the extended frame. The extension frame is also provided with a three-point hitch to which the agricultural implement may be attached. A control mechanism is provided whereby the three-point hitch may be raised or lowered and pivoted as is conventional for control of an agricultural implement. A special resilient mounting arrangement is provided for the three-point hitch so that an agricultural implement attached to the hitch will "float". Lastly, the three-point hitch may be laterally shifted with respect to the front wheels by an adjustment mechanism.

One advantage of the method and apparatus of the present invention is that it improves control over the alignment of an agricultural implement and therefore increases crop yields and production. Additionally, by means of improved alignment of a cultivator implement, weed control is improved and the use of chemicals for weed control may be decreased.

A further advantage of the method and apparatus of the present invention is that it improves the visibility of the agricultural implement and its alignment to the tractor operator.

Another advantage of the present invention is that it substantially reduces the cost of providing a ridge till tractor and the maintenance and storage costs which would be incurred if a specialized ridge till tractor were provided.

A still further advantage of the present invention is that it improves the control over an agricultural implement and the weight distribution of an agricultural implement between the front and rear wheels of a tractor.

A yet further advantage of the present invention is that, by articulating the extended frame, the turning radius of the tractor is decreased thereby improving control of the tractor, particularly when the tractor is to be used on a hillside.

Yet another further advantage of the present invention is that it permits the rapid conversion of a conventional tractor to a tractor having an extended frame and further permits the rapid attachment of a farm implement to the extended frame.

Still another advantage of the method and apparatus of the present invention is that it reduces tractor operator fatigue.

The present invention, in one form thereof, comprises a method for extending an agricultural tractor frame to enable attachment of an agricultural implement between the front and rear wheels of the tractor. The method comprises the steps of first removing the front wheels from the tractor and then attaching an extension frame to the tractor frame.

The present invention, in one form thereof, further provides an apparatus for extending the frame of an agricultural tractor which includes a set of rear wheels and a set of front wheels and for permitting the set of front wheels to be dismounted. The apparatus comprises an extension frame and an attaching device therefor so that the extension frame may be attached to the tractor frame. A front wheel attaching device is connected to the extension frame for attaching a set of front wheels to the extension frame. A hitch is also provided on the extension frame for attaching an agricultural implement to the extension frame intermediate the front wheel attaching device and the extension frame attaching device.

The present invention, in one form thereof, still further provides an apparatus for supporting an agricultural implement including a tractor frame and a set of rear wheels mounted on the tractor frame. An engine is supported by the tractor frame and is drivingly connected to the rear wheels. The tractor frame also includes a device for mounting the front wheels. An extension frame is selectively detachably connected to the tractor frame and a set of front wheels is secured to the extension frame. A hitch is also provided for attaching an agricultural implement to the extension frame at a point intermediate the front wheels and the tractor frame.

The present invention, in one form thereof, also provides an apparatus for attaching an agricultural implement to a tractor frame including a hitch for attaching an implement, an attachment device operatively associated with the hitch for attaching the hitch to the tractor frame and an adjustment device for selectively laterally adjusting the position of the hitch with respect to the tractor frame.

The present invention, in one form thereof, furthermore provides an apparatus for attaching an agricultural implement to a tractor frame including a hitch for attaching the implement, an attachment device operatively associated with the hitch for attaching the hitch to the frame and a resilient device for resiliently supporting the attachment device.

It is an object of the present invention to provide a method and apparatus for extending the frame of a conventional farm tractor to permit mounting of an agricultural implement between the front and rear wheels of the tractor.

Another object of the present invention to provide an extension frame for a conventional tractor whereby the front wheels of the tractor may be removed and may be attached to the front of the extension frame.

Yet another object of the present invention is to provide a method and apparatus whereby the frame of a tractor is extended to provide greater control over and visibility of an agricultural implement.

Still another object of the present invention is to provide an articulated extended frame for a tractor whereby the tractor turning radius for the extended tractor is decreased.

Still a further object of the present invention is to provide an extension frame for converting a conventional tractor to a tractor having an extended frame which is less costly than a specialized extended frame tractor.

A yet further object of the present invention is to provide a tractor with an extended frame wherein the agricultural implement is caused to "float" by supporting the three-point hitch resiliently on the extended tractor frame.

It is also an object of the present invention to provide a tractor wherein the agricultural implement may be laterally shifted.

BRIEF DESCRIPTION OF THE DRAWINGS

The above mentioned and other features and objects of this invention and the manner of attaining them will become more apparent and the invention itself will be better understood by reference to the following description of an embodiment of the invention taken in conjunction with the accompanying drawings, wherein:

FIG. 1 is a side elevational view of the extended tractor assembly according to the present invention;

FIG. 2 is a top plan view of the tractor of FIG. 1;

FIG. 3 is a view, in cross section, of the tractor taken along line 3—3 of FIG. 1;

FIG. 4 is a view of the tractor in cross section taken along line 4—4 of FIG. 1;

FIG. 7 is a partial side elevational view of another embodiment of the mounting structure for the three-point hitch;

FIG. 8 is a cross sectional view of the three-point hitch mounting structure of FIG. 7;

Corresponding reference characters indicate corresponding parts throughout the several views of the drawings.

Figure 5:
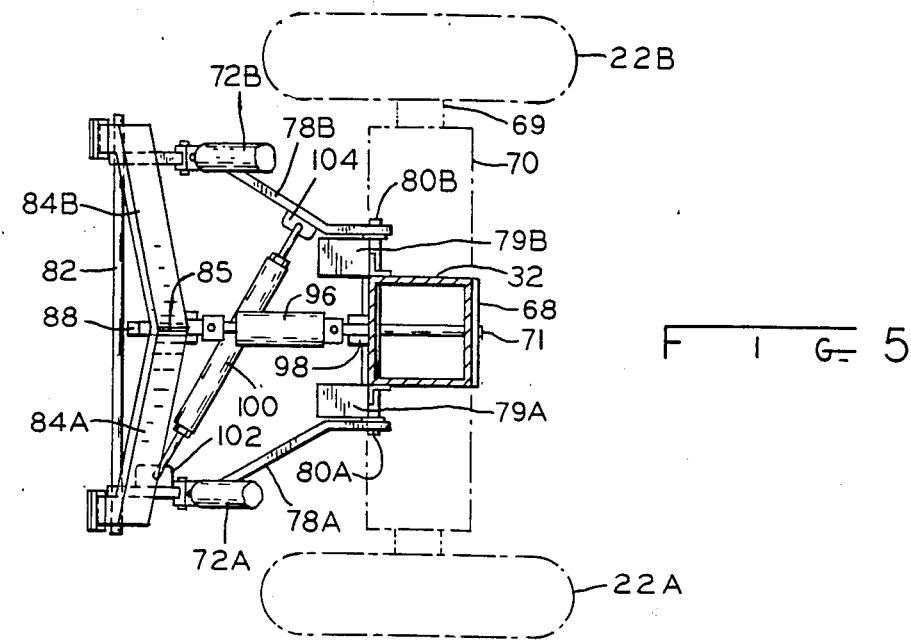
FIG. 5 is a view, in cross section, of the front wheel and three-point hitch assembly of the tractor taken along line 5—5 of FIG. 1.

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Referring to FIGS. 1 and 2, a tractor 10 is shown including a cab 12 and an engine compartment 14. The tractor also includes a frame 16 to which are secured the tractor rear wheels 18 and which is also adapted for attachment of a set of tractor front wheels thereto. An extension frame 20 is shown to which a set of front wheels 22 are secured. It should be noted that wheels 22 may be either the front wheels of the tractor 10 or another set of front wheels. A three-point hitch 24 is also secured to the extension frame between the front wheels 22 and the rear wheels 8. Extension hoses 23 and 27 are shown for connecting the hydraulic power supply lines of the tractor to the hitch control and steering mechanism. While most current tractors use hydraulic steering and hitch control mechanisms, it should be noted that mechanical or electrical extension devices could be used for tractors which have mechanical or electrical steering and hitch control mechanisms.

Referring further to the extension frame 20, a horizontal beam 30 is provided which, in the preferred embodiment, comprises a steel beam of square cross section as best seen in FIG. 3. It should be understood that a beam of any suitable cross section may be used. Preferably hydraulic extension hoses 23 and 27 are routed through the interior of hollow beam 30 although they may be arranged in any suitable manner. A vertical beam 32 is secured to horizontal beam 30 and a brace 33 is provided to strengthen the securement of vertical beam 32 to horizontal beam 30. Horizontal beam 30 is provided with a pair of flanges 34, as best seen in FIG. 4, and the upper end of vertical beam 32 is provided with a mounting plate 36. Plate 36 is secured to flanges 34 by means of bolts 38 which are disposed in apertures 40 as best seen in FIG. 2. In the preferred embodiment, flanges 34 are substantially longer than plate 36. Flanges 34 are also provided with substantially more apertures 40 than is plate 36. By means of this arrangement, plate 36 and therefor vertical beam 32 may be mounted closer to or further away from rear wheels 18, thereby providing a selectively variable amount of distance between the tractor rear wheels 18 and front wheels 22 whereby agricultural implements of various sizes may be accommodated. It should, of course, be understood that it is preferable, from the view point of control of the tractor, to have front wheels 22 as close as possible to rear wheels 18, thereby reducing the pivoting radius of the tractor.

Referring now to FIGS. 1-3, extension frame 20 is secured to tractor frame 16 by means of a support beam 42 which is secured to horizontal beam 30 by means of welding, bolts, or the like. The bottom portion of support beam 42 includes a generally vertical pivot pin 44 which engages with a pivot bracket 46 which in turn is secured to bottom cross brace 47 of tractor frame 16. A second vertical pivot pin 45 engages with a top cross brace 47. Thus, extension frame 20 is free to pivot on pivot pins 44 and 45 whereby the extended frame of tractor 10 is articulated to reduce the turning ratio of the tractor and to also aid in control of the tractor on hilly slopes and the like. Support beam 42 also includes a brace member 48 to strengthen the connection between support beam 42 and horizontal beam 30. Four straps 50, two of which are provided on both the right and left side of tractor 10, further strengthen the extension frame 16 and are secured to the upright members 52 and the horizontal members 53 of extension frame 20. Horizontal members 53 are secured to tractor frame 16 as by bolts, welding or the like. A pair of hydraulic cylinders 54 are provided for controlling the articulation of extension frame 20 with respect to tractor frame 16 about pivot pins 44 and 45. Cylinders 54 are secured to tractor frame 16 by means of pivot pins 56. The hydraulic cylinder rods 58 of cylinders 54 are secured to horizontal beam 30 of extension frame 20 by means of pivot pins 60. Thus, by controlling hydraulic cylinders 54a and 54b, the frame of tractor 10 comprising tractor frame 16 and extension frame 20 may be caused to articulate. The operation of cylinders 54a and 54b may be cooordinated with the operation of the steering mechanism, if desired, by interconnecting the hydraulic control lines of cylinders 54a and 54b with the hydraulic control lines for the tractor front wheel steering mechanism.

Referring now to FIGS. 1-5, front wheels 22 are rotatably secured to a cross brace 70 which in turn is pinned to vertical beam 32 by means of horizontal pin 71. Pin 71 engages with a pair of brackets 68 which are welded or secured in some other suitable fashion to vertical beam 32. Thus, the entire front wheel assembly consisting of axle 69, cross brace 70, and front wheels 22 may be detached from a conventional tractor, such as tractor 10, and then secured to extension frame 20. Alternatively, extension frame 20 may be provided with its own set of front wheels. It should be noted that, while not shown in the preferred embodiment, a drive mechanism may also be provided for wheels 22 so that the tractor has four wheel drive.

A pair of cylinders 72 are provided for raising and lowering three-point hitch assembly 24. Cylinders 72 are secured to extension frame 20 by means of pivot pins 74. Cylinders 72 are secured to a respective pair of links 78a and 78b by means of pivot pins 76a and 76b. Links 78 are also pivotably secured by means of pivot pins 80 to a pair of respective flanges 79a and 79b which in turn are secured to vertical beam 32. Three-point hitch assembly 24 is pivotably secured to links 78a and 78b by means of a pivot bar 82. Thus, as cylinders 72 are telescopically retracted or extended, links 78 will pivot about pivot pins 80a and 80b thereby raising and lowering three-point hitch assembly 24.

As best seen in FIG. 4, three-point hitch assembly 24 also includes a pair of upright 84a and 84b. Uprights 84 are angled inwardly in the upward direction to form two legs of a triangle of the three-point hitch assembly having an apex 85. The horizontal leg of the three-point hitch assembly is shown at 86 and comprises a cylindrical link. Three-point hitch assembly 24 also includes a hook member 88 secured to the apex or uppermost part 85 of the frame of the three-point hitch assembly 24. Hook 88 is adapted to receive a mating part of an agricultural implement which may be suspended therefrom. A cylinder 96 is pivotably secured to a bracket 98 which in turn is secured to vertical beam 32. Cylinder 96 is secured at its other end to the apex 85 of the three-point hitch assembly 24. Thus, by operating hydraulic cylinder 96, the three-point hitch assembly 24 may be caused to pivot about horizontal pivot pin 82 whereby an agricultural implement which is suspended from hook member 88 may also be caused to tilt and pivot about horizontal pin 82. Thus, the tractor operator may raise or lower an agricultural implement suspended from hook 88 by operating cylinders 72a and 72b and may furthermore tilt the agricultural implement by means of operation of cylinder 96.

Referring now to FIG. 5, it is seen that an extendable or telescoping link 100 is provided between one corner of the structure comprising generally parallel horizontal links 78a, 78b, horizontal pivot bar 82, and pivot pins 80. This structure is shown as a trapezoid but could comprise a parallelogram, rectangle, or other suitable shape. Link 100, in the preferred embodiment, is shown as a turnbuckle 100 which may be selectively extended or retracted. Turnbuckle 100 is secured to a pair of brackets 102 and 104 which in turn are secured to horizontal links 78a and 78b. Since the front member of the trapezoid comprising pins 80a and 80b is laterally fixed with respect to wheels 22a and 22b, when turnbuckle 100 is extended or retracted, links 78a and 78b will be moved closer together or further apart and the included angles of the trapezoid will change thereby causing horizontal pivot bar 82 and horizontal link 86 to shift to the right or the left with respect to the front wheels 22a and 22b. This in turn causes the entire three-point hitch to shift laterally. Since hook 88 is secured to the three-point hitch assembly, the lateral position of hook 88 will also shift with respect to front wheels 22a and 22b when turnbuckle 88 is adjusted. Therefore, when an agricultural implement is secured to hook 88, the lateral position of the implement, which determines its alignment with a crop row or ridge when the tractor moves along the ground, may be shifted a matter of inches to the right or left. Thus, the use of turnbuckle 100 permits the accurate alignment of an agricultural implement suspended from hook 88 with the ridges so that the front wheels 22 and rear wheels 18 of tractor 10 are aligned properly with the valleys between the ridges and the agricultural implement is properly aligned with the ridges themselves. As explained hereinabove, this is a very important advantage which results in increased crop production and the potential reduced need for herbicides to control weeds.

Figure 9:
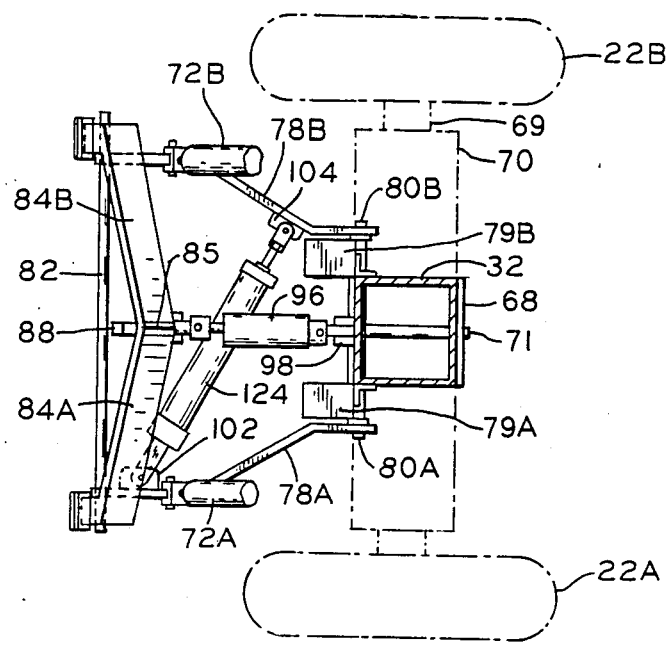
FIG. 9 is a view, in cross section, of another embodiment of the front wheel and three-point hitch assembly.

Referring now to FIG. 9, there is shown an alternate embodiment of the lateral adjustment mechanism for hook 88. In the embodiment, the telescoping member is shown as a hydraulic cylinder 124. Therefore, the tractor operator can make lateral adjustments to the position of the agricultural implement while the tractor is in operation and moves along the ridges.

Figure 6:
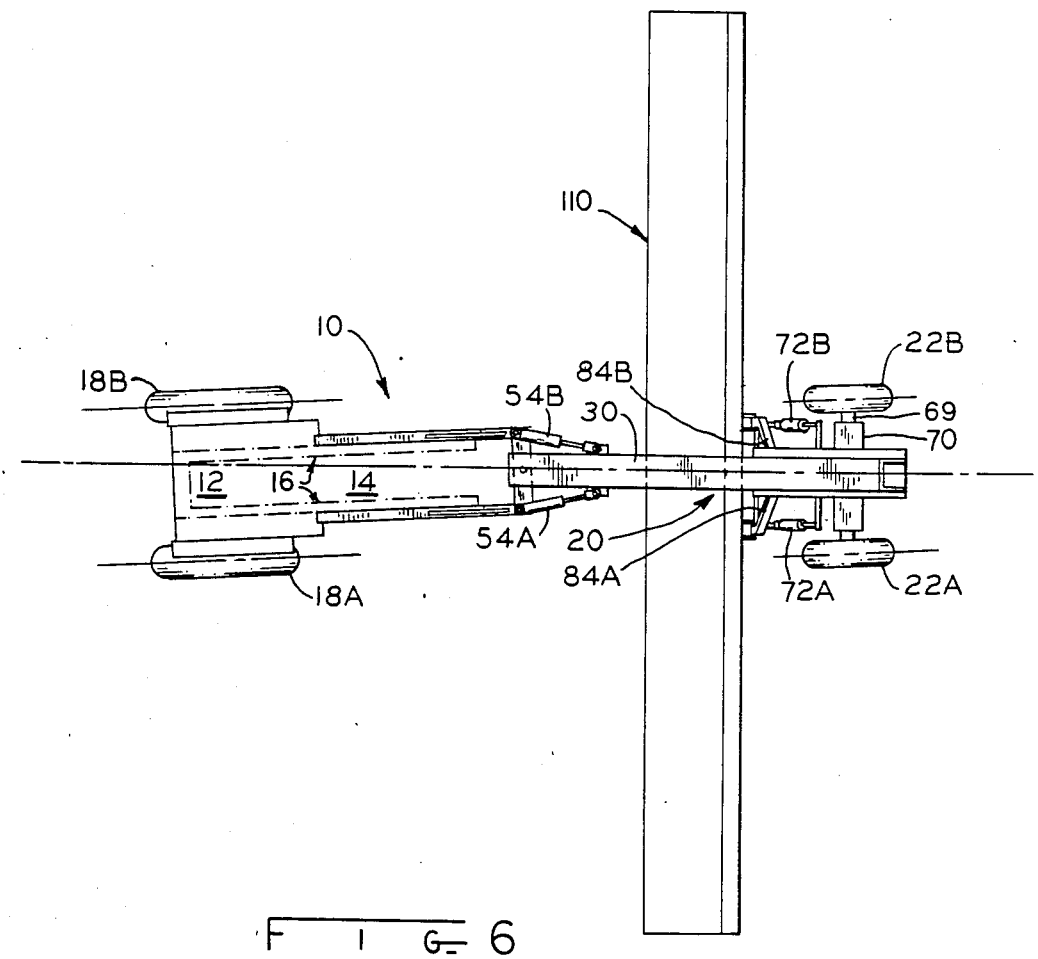
FIG. 6 is a plan view of the tractor of FIG. 1 including a farm implement attached to the three-point hitch.

Referring now to FIG. 6, the tractor 10 is shown with an agricultural implement 110, such as a planter or a cultivator, attached to the three-point hitch assembly 24. The width of the implement may cover a plurality of rows or ridges such as, for instance, twelve (12). The implement 110 will, therefore, be approximately thirty (30) feet wide. Wider or narrower implements may also be used. FIG. 6 clearly illustrates that the use of an articulated extension frame 20 is particularly useful under side hill conditions since the articulation allows the operator to turn the wheels 22 into the hillside. As clearly shown in FIG. 6, the rear wheels 18 and the front wheels 22 are adjusted so they tend to run uphill whereas the articulated extension frame 20 may be kept aligned with the ridges. Therefore, in this type of arrangement, the tractor will "crab" so that the sliding downhill movement of the tractor is constantly adjusted for by the uphill movement of the wheels of the tractor. It can also clearly be seen from this figure that if the cultivator or planter were to be mounted behind the tractor, as is conventional, the crabbing movement of the tractor would cause sideways shifting of the agricultural implement 110 away from the centerline of the tractor whereby alignment of the agricultural implement with the ridges would be impossible to maintain.

In operation when it is desired to convert a conventional tractor to a tractor with an extended frame, the front end of the tractor is supported as by a jack. The front wheels and axle assembly is dismounted from the tractor. The extension frame 20 is connected to the tractor frame 16 by dropping the pivot pins 44 and 45 in their sockets. Cylinders 54 are secured to the frame 16 of tractor 10. The front wheel and axle assembly is then secured to the vertical column 32 by means of pin 71. Hydraulic extension lines or hoses are provided and are coupled between the existing steering and control mechanism of the tractor and the hydraulic steering and three-point hitch control mechanism located at the front of the extension 20. The tractor is then ready for use and an agricultural implement is attached to hook 88. If any electrical connections need to be made to the extended frame, electrical extension cables may also be used. The extension cables and hydraulic hoses may, for convenience, be routed through tubular frame 30 from tractor 10 to the front of extension frame 20.

It should also be noted that the extended tractor may, of course, be used not only in ridge till farming but also may be used for conventional farming if it is desired to support an agricultural implement between the front and rear wheels of a tractor. The height of horizontal beam 30 may also be varied. The height should be as low as possible for maximum stability of the tractor. In the preferred embodiment, the height of horizontal beam with respect to the ground is six feet.

Turning now to FIGS. 7 and 8, an alternative embodiment for securing the three-point hitch assembly 34 to the extension frame is provided. In this arrangement, the cylinders 72 are not secured directly to pivot points 74 but are instead provided with extension rods 116. Extension rods 116 are provided with washers 119 and nuts 118. Springs 120 are then provided between washers 119 and brackets 114 which are secured to frame 20. With the cylinders 72 in their locked positions, when an upward or downward force is imparted to the agricultural implement, the force is transmitted by means of hook 88 and three-point hitch assembly 24 to cylinder 72. Springs 120 will resiliently absorb these forces whereby the agricultural implement is caused to "float"- and springs 120 act as shock absorbers. Therefore, small shocks caused by uneven terrain will not be immediately transmitted through frame 20 to front wheels 22 when upward and downward forces are encountered by the agricultural implement. This is a significant advantage and also further aids in added controllability of the tractor.

Figure 10:
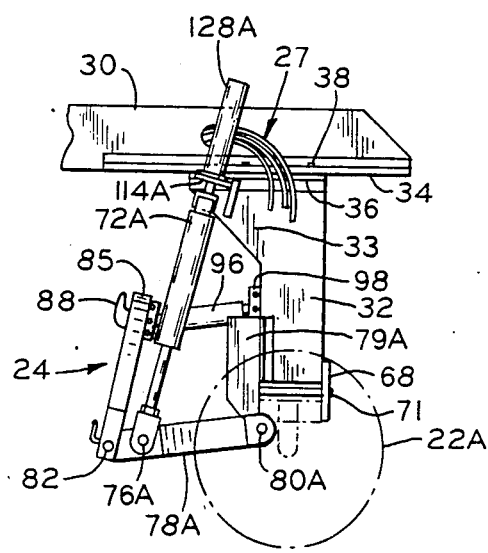
FIG. 10 is a partial side elevational view of the three-point hitch mounting structure.

Turning now to FIG. 10, an alternate embodiment of the resilient mounting for three-point hitch assembly 34 is shown. Here a pair of pneumatic or air springs or cylinders 128 are provided for resiliently connecting hydraulic cylinder 72 to frame 20. Thus, the cylinders 128 may be provided with valves to add or remove air from cylinder 128 whereby more or less shock absorbing action is provided.

Thus, a method and apparatus has been provided for extending the frame of the tractor whereby an agricultural implement may be mounted on the tractor between the front wheels and the rear wheels to provide for improved visibility and controllability of the implement and for improved accuracy in working a field. The invention is particularly useful for ridge till farming.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. An apparatus for extending the frame of an agricultural tractor adapted for pulling farm implements for adapting said tractor to ridge or no till farming, said tractor including a set of rear wheels, a frame, a set of front wheels, and an engine mounted between said front and rear wheels, the apparatus comprising:
    a longitudinal extension frame;
    extension frame attaching means connected to said extension frame for attaching said extension frame to said tractor frame along with removal of said tractor front wheels;
    pivoting means secured to said extension frame to enable pivoting of at least a portion of said extension frame relative to said tractor frame about a substantially vertical axis;
    front wheel attaching means connected to said extension frame for attaching at least two front wheels to said extension frame;
    a hydraulically operated steering apparatus operably secured to said front wheels and to said extension frame pivoting means;
    hydraulic fluid hose extension means for connecting the tractor hydraulic steering control means to said hydraulic steering apparatus; and
    a three point hitch connected to said extension frame for attaching an agricultural implement to said extension frame at a position intermediate said front wheel attaching means and said extension frame attaching means.

2. The apparatus of claim 1 wherein said means for attaching said front wheels includes means for selectively adjusting the position of said front wheel attaching means whereby the distance between said front wheels and said extension frame attaching means may be selectively varied.

3. The apparatus of claim 1 including means connected to said three point hitch for selectively laterally adjusting the position of said hitch whereby the lateral operating position of an agricultural implement attached to said hitch with respect to said front wheels may be selectively varied.

4. The apparatus of claim 3 wherein said lateral adjusting means comprises a telescoping link, said link being diagonally secured to two generally parallel horizontal support members for supporting said hitch.

5. The apparatus of claim 1 wherein said implement attaching means includes resilient means for resiliently attaching an agricultural implement to said extension frame.

6. The apparatus of claim 5 wherein said resilient means comprises a spring, said spring being connected at one end to said extension frame and being connected at a second end to said hitch.

7. The apparatus of claim 1 including hydraulic means for controlling said pivoting means, said hydraulic means coupled to said hydraulic steering apparatus, whereby said pivoting means and said front wheels are simultaneously controlled by common means.

8. A ridge till or no-till farming apparatus for supporting an agricultural implement including:
    a tractor frame including means for pulling farm implements behind said tractor;
    a set of rear wheels mounted on said tractor frame;
    an engine supported by said tractor frame forwardly of said rear wheels and drivingly connected to said rear wheels;
    means for mounting at least two front wheels on said tractor frame;

a longitudinal extension frame pivotably selectively detachably connected to said tractor frame whereby at least a portion of said extension frame may be pivoted relative to said tractor frame about a substantially vertical axis;

a set of front wheels secured to said extension frame;

hydraulic steering means operably coupled to said set of front wheels;

means for controlling the relative pivoting of said portion of said extension frame;

hydraulic steering control means operably coupled to said hydraulic steering means and said means for controlling the pivoting of said portion of said extension frame, for controlling the front wheels and the extension frame pivoting controlling means; and implement attaching means including a three point hitch connected to said extension frame for attaching an agricultural implement to said extension frame at a point intermediate said front wheels and said tractor frame.

9. The apparatus of claim 8 including lateral adjusting means connected to said implement attaching means for laterally adjusting the position of said agricultural implement attaching means with respect to said set of front wheels whereby the lateral operating position of an agricultural implement attached to said implement attaching means may be selectively varied with respect to said set of front wheels.

10. The apparatus of claim 9 wherein said lateral adjusting means comprises an extendable link, said link being diagonally secured to two generally parallel and horizontal support members for said implement attaching means.

11. The apparatus of claim 8 wherein said implement attaching means includes resilient means for resiliently attaching an agricultural implement to said extension frame.

12. The apparatus of claim 11 wherein said resilient means comprises a spring, said spring having one end connected to said extension fame and a second end connected to said agricultural implement attaching means.

* * * * *

UNITED STATES PATENT AND TRADEMARK OFFICE
CERTIFICATE OF CORRECTION

PATENT NO. : 4,679,634

DATED : July 14, 1987

INVENTOR(S) : Gerald Lee Buhlman

It is certified that error appears in the above-identified patent and that said Letters Patent is hereby corrected as shown below:

Col. 6, line 4, change "8" to --18--;
Col. 7, line 4, change "cooredinated" to --coordinated--;
Claim 1, Col. 10, line 3, insert --till-- after "ridge".

Signed and Sealed this

Fifteenth Day of December, 1987

Attest:

DONALD J. QUIGG

*Attesting Officer*    *Commissioner of Patents and Trademarks*